United States Patent [19]

Sawka et al.

[11] 4,450,382
[45] May 22, 1984

[54] D.C. LAMP BURN-OUT PROTECTION

[75] Inventors: Steven Sawka; Vincent Moretti; Sam F. Heal, all of Macomb, Mich.

[73] Assignee: The United States of America as represented by the Secretary of the Army, Washington, D.C.

[21] Appl. No.: 390,426

[22] Filed: Jun. 21, 1982

[51] Int. Cl.³ .............................................. B60Q 1/02
[52] U.S. Cl. ...................................... 315/082; 315/77; 315/123; 315/201
[58] Field of Search .................... 315/77, 82, 119, 121, 315/123, 201

[56] References Cited

U.S. PATENT DOCUMENTS 3,639,805  2/1972  Muench et al. ........................ 315/82
3,711,739  1/1973  Maley .................................... 315/82

Primary Examiner—Harold Dixon
Attorney, Agent, or Firm—Peter A. Taucher; John E. McRae; Robert P. Gibson

[57] ABSTRACT

A D.C. lamp system having a number of small zener diodes arranged in electrical parallelism with various lamp current supply wires. The zener diodes are sized so that the collective wattage ratings of the zeners is equal to the arithmetical product of the D.C. supply voltage and the summation of the safe amperages of the lamps in the system. In event of normal lamp burnout, any tendency of the other lamps to also burn out due to excessive current surge is countered by the action of the zener diodes; potential excess current is drained through the zener diodes to ground. A large number of small zener diodes are used in preference to one large zener diode, thereby minimizing the need for heat sinks or special cooling means required by a larger zener diode.

3 Claims, 3 Drawing Figures

4,450,382 ial lamps. When a large number of small zener diodes is used there is no requirement for a special zener diode cooling system, whereas a large power zener diode requires a special heat sink or other cooling mechanism.

D.C. LAMP BURN-OUT PROTECTION

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to means for preventing premature failure of lamps in a D.C. system, especially lamps located on a highway trailer. Such highway trailers commonly have a number of lamps thereon; as for example, service clearance lamps located at the corners of the trailer to indicate the trailer outline, dome lights to illuminate the trailer interior space, stop lights (brake lights) at the rear of the trailer, turn indicator lights, and tail indicator lights. Trailers used by the military also have shielded blackout lights that are used to define the trailer outline dimensions when wartime conditions preclude use of the normal lighting system.

Commonly, a system can include as many as thirty lamps supplied from a voltage source in the tractor used to tow the trailer. A multiwire cable extends from the rear end of the tractor to an electrical receptacle mounted in the forward end of the trailer. Individual wires extend from terminals in the receptacle to individual lamps or groups of lamps on the trailer. In the event that one lamp should burn out, the available wattage is applied to a lesser number of lamps, thereby increasing the amperage through and voltage across each lamp in the associated system. The higher amperage and voltage tend to promote early failure of the remaining lamps, with a progressively increasing detrimental effect as each lamp burns out.

In the case of military applications, lighting system problems are somewhat complicated because the military services have adopted a policy of purchasing commercial tractors and trailers for reasons of lower cost and greater availability; the commercial units have 12 volt lighting systems instead of the 24 volts used on military equipment. When a military tractor having a 24 volt electrical system is used to haul a commercial trailer having a 12 volt lighting system the lamp burn-out problem becomes more acute. A solution to the lamp burn-out problem should take into account the fact that a 12 volt commercial tractor might be required to haul a 12 volt trailer or a 24 volt trailer; and a 24 volt military tractor might be required to haul a 12 volt trailer or a 24 volt trailer.

It has been proposed to provide resistors in the trailer electrical systems, arranged so that individual resistors are in series with individual lamps. However, in the case of commercial trailers, the resistors must be spliced in at the trailer electrical control box so that they can be bypassed, should the trailers be used with tractors having 12 volt systems. The use of resistors makes for a relatively complex and costly wiring harness.

The present invention is directed to the use of zener diodes for limiting the voltage or amperage applied to the individual lamps on a trailer, thereby preventing excessive current flows through the lamps as would tend to cause premature lamp failure. While it is technically possible to use a single large power zener diode in parallel with the entire lamp circuit we prefer to use a multiplicity of smaller zener diodes in parallel with individual lamps. When a large number of small zener diodes is used there is no requirement for a special zener diode cooling system, whereas a large power zener diode requires a special heat sink or other cooling mechanism.

THE DRAWINGS

Figure 1:
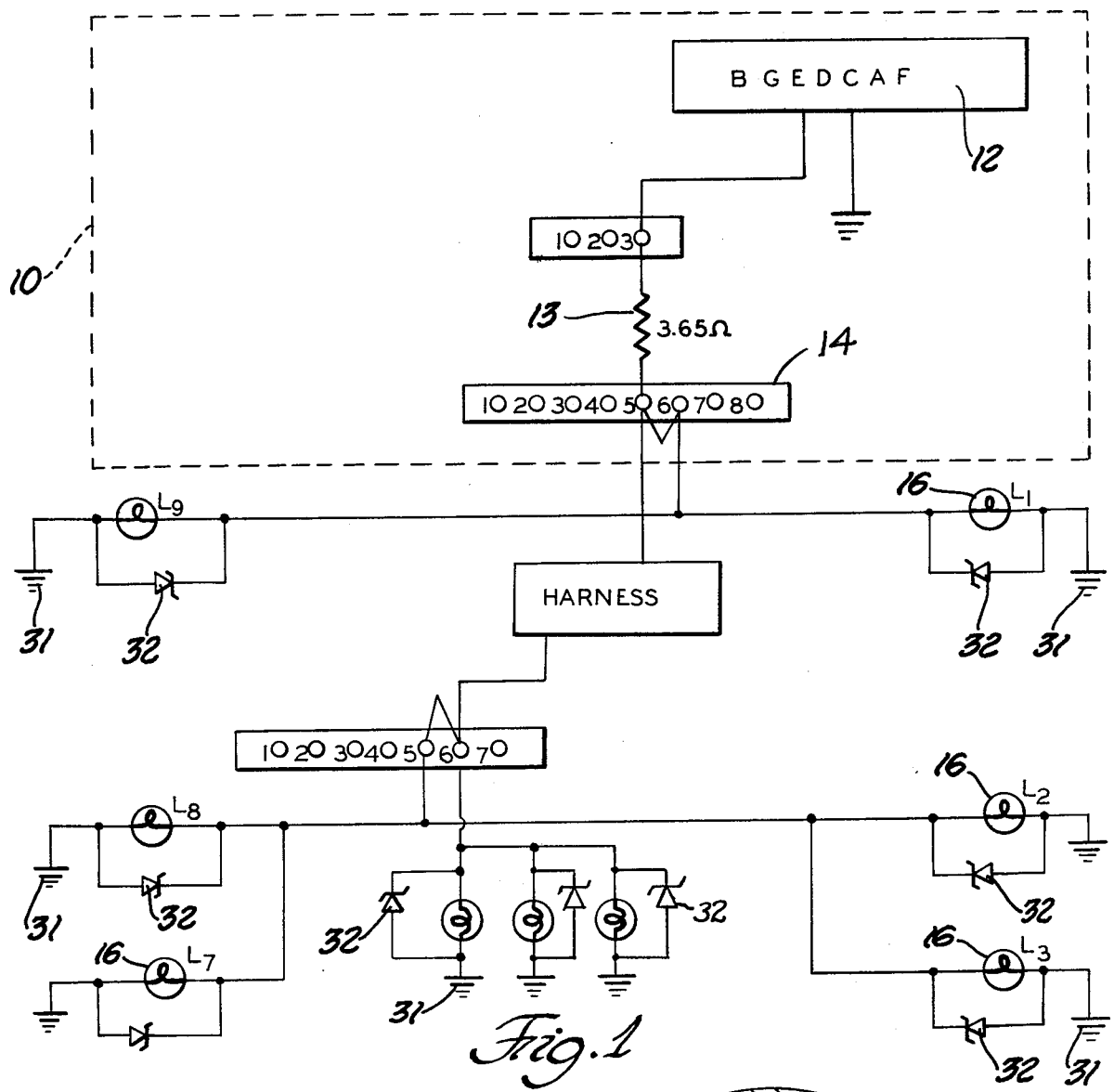
FIG. 1 illustrates an electrical lamp system for a 12/24 volt military trailer embodying our invention.

FIG. 1 shows a military trailer lamp energizer circuit that includes a terminal board 10 suitably mounted at the trailer front end. An electrical receptacle 12 is mounted on the board for connection to an electrical cable extending from a nonillustrated tractor. The receptacle includes pin-type terminals arbitrarily numbered A through G in the drawing; the aforementioned cable transmits a D.C. voltage from the tractor to each pin-type terminal, typically twenty-four volts D.C. A resistor 13 is employed to provide twelve volts at a second receptacle 14. Each terminal in receptacle 14 supplies current through associated wiring to an individual lamp or group of lamps. Representative lamps in the system are identified by numerals 16.

Each lamp in the system includes a ground connection to the trailer frame. Our invention involves adding to the trailer lamp energizer system individual zener diodes 32 for each lamp or one zener didode for each associated lamp system. Each zener diode is connected between one of the lamp energizer wires and ground 31 so that each zener diode is arranged in electrical parallelism with the associated lamp or lamps energized by the respective energizer wire. Each zener diode is in a reverse biased orientation, whereby when the supplied voltage $V_s$ is for any reason above the zener diode breakdown voltage $V_z$ a current will flow across the zener diode to ground 31, thereby reducing the current that would otherwise flow through the associated lamp or lamps. The zener diode places a ceiling on the lamp current, thereby protecting the lamps against premature lamp failure. The zener diodes will not protect the lamps against normal failure caused by normal current flows, but they will protect against failures due to excessive current surges associated with the failure of associated lamps. For example, if any one of the service lamps should fail, the current for the failed lamp would be applied to the remaining lamps, thus providing an unsafe overamperage condition at the remaining lamps; however, the zener diode 32 associated with the respective lamp supply line will respond to the overwattage condition to drain off the unwanted current to ground 31.

Zener diodes are selected so that their collective total wattage rating is equal to the arithmetical product of the D.C. voltage source $V_s$ and the summation of the safe amperages for all lamps in the system. The zener diodes collectively act as one large zener diode sized to meet overamperage or overvoltage of the entire lamp system. Use of a large number of small zener diodes, as herein proposed, is advantageous in that each small zener is self-cooled, thus avoiding the need for a large heat sink or auxiliary cooling system required by a large zener diode. In one test installation we used individual zener diodes identified as Motorola IN5349B, having a breakdown voltage $V_z$ of 12 volts. No separate heat sink was required when this zener diode was employed in parallel with individual lamps in a conventional 12 volt trailer lighting system.

Figure 2:
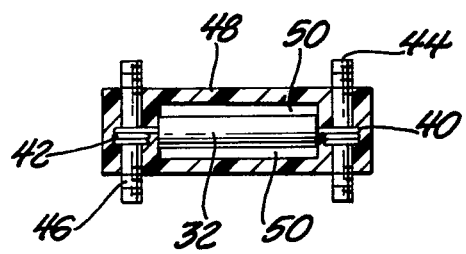
FIG. 2 illustrates an electrical component usable in the FIG. 1 system to operatively mount a zener diode.

FIG. 2 shows one way to connect a representative zener diode between a lamp supply line and a ground line. As shown, the lead wires 40 and 42 for zener 32 are wrapped around screw terminals 44 and 46 which are encapsulated within a dielectric plastic sheath 48. Sheath 48 is spaced from the zener diode by an air space 50, which promotes air cooling of the zener. Terminal 44 may be connected to the lamp supply line, whereas terminal 46 may be a ground line or connected to the ground line. Each terminal 44 or 46 may be double-ended to facilitate hook up of the associated lamp, not shown in FIG. 2, in parallel with zener diode 32.

Figure 3:
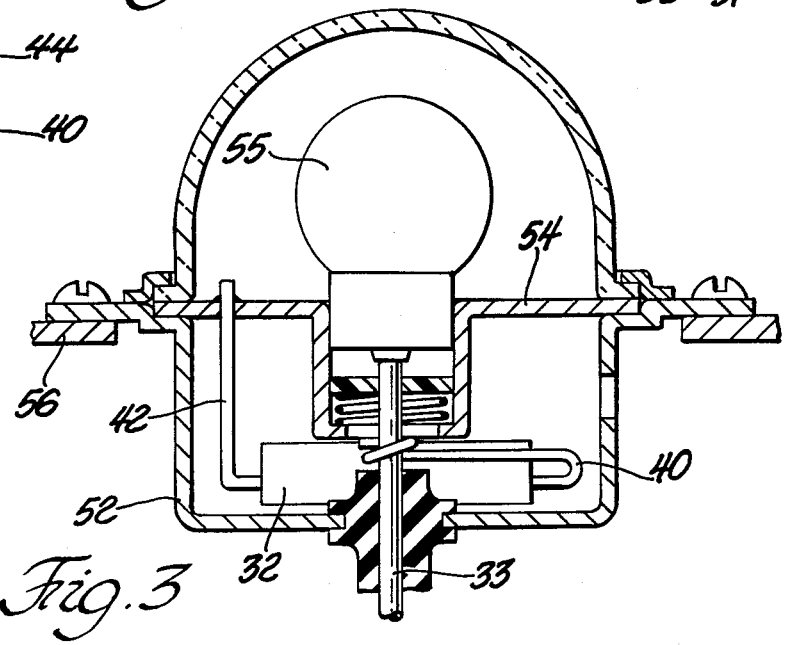
FIG. 3 illustrates an alternate mounting arrangement for the zener diode.

FIG. 3 illustrates an arrangement wherein the zener diode is assembled into an individual lamp housing 52 to use the lamp housing as a ground connection. Where housings are not grounded, a ground supply wire would be required. In illustrative FIG. 3 lead wire 40 for zener 32 is solder-connected to the lamp voltage supply wire 33. The other lead wire 42 for the zener is soldered to the socket plate 54 for the bulb 55. Plate 54 is conductively engaged with metal housing 52 which has a ground connection with trailer frame wall 56.

The schematically-illustrated system and hardware components are designed especially for use on commercial 12 volt trailers that may be employed by the military services with either military 24 volt tractors or commercial 12 volt tractors. When a 12 volt tractor hauls the trailer the zener diodes are inactive; when a 24 volt military tractor is used the zener diodes perform their lamp portection functions. A preferred system would employ one small zener diode for each lamp in the system. However, it is possible to use one zener diode for more than one lamp, especially where the lamps have small current consumptions, e.g. blackout lamps. The zener diodes are selected and sized with the aim of avoiding a requirement for a heat sink or special auxiliary cooling system. Each zener diode should preferably be exposed to the ambient air for enhancement of the self-cooling action, necessary to preclude zener burn-out.

The collective wattage ratings of the zener diodes are equal to the arithmetical product of the D.C. voltage source $V_s$ (at receptacle 14) and the summation of the safe amperages drawn by all lamps in the system, whereby the zener diodes collectively protect the lamps against overvoltage and/or overamperage. Each zener diode has a breakdown voltage $V_z$ that is only slightly greater than voltage source $V_s$, whereby transient increases in voltage $V_s$ produce a current flow through the zener diodes. Primary use of the invention is to protect trailer lighting systems; the invention could also be used to protect other electrical components on the trailer subject to destruction by excessive electrical power inputs.

We wish it to be understood that we do not desire to be limited to the exact details of construction shown and described for obvious modifications will occur to a person skilled in the art.

We claim:

1. In a trailer electrical lighting system comprising a first electrical receptacle (12) adapted to be coupled to a remote D.C. voltage source on a tractor, a second receptacle (14), and resistor means (13) between the receptacles for dropping the voltage at the second receptacle to a voltage rating $V_s$; a number of lamps mounted on the vehicle at selected points thereon; individual energizer wires extending from the second receptacle to individual lamps and groups of lamps; ground means for the various lamps; and a zener diode connecting each energizer wire to the ground means in a reverse biased orientation to thereby control the maximum voltage applied to the individual lamps; the collective wattage ratings of the zener diodes being equal to the arithmetical product of the D.C. voltage $V_s$ and the summation of safe amperages drawn by all lamps in the system, whereby the zener diodes collectively protect the lamps against over-voltage and/or overamperage; each zener diode having a breakdown voltage $V_z$ that is only slightly greater than the voltage $V_s$, whereby transient increases in voltage $V_s$ produce a current flow through the zener diodes.

2. The electrical system of claim 1 wherein at least some of the ground means comprise grounded lamp housings (52), each lamp housing having a zener diode mounted therein so that one zener diode lead connects to the associated supply wire and the other zener diode lead connects to the lamp housing.

3. The electrical system of claim 1 wherein at least some of the zener diodes are located within dielectric sheaths (48), each sheath having an air passage therethrough enabling ambient air to circulate around the zener diode surface.

* * * * *